United States Patent [19]

Miller, Jr.

[11] 4,331,365

[45] May 25, 1982

[54] NESTED BELLEVILLE SPRING SUPPORT FOR COMPLIANT THRUST BEARINGS

[75] Inventor: William H. Miller, Jr., Albany, N.Y.

[73] Assignee: Mechanical Technology Incorporated, Latham, N.Y.

[21] Appl. No.: 109,133

[22] Filed: Jan. 2, 1980

[51] Int. Cl.³ .............................................. F16C 32/06
[52] U.S. Cl. ....................................... 308/9; 308/26; 308/160
[58] Field of Search ................... 308/9, 160, 170, 5 R, 308/DIG. 1, 26, 184 R, 184 A

[56] References Cited

U.S. PATENT DOCUMENTS

| | | |
|---|---|---|
| 1,494,010 | 5/1924 | Newhouse . |
| 1,684,693 | 9/1928 | Bohm . |
| 3,215,479 | 11/1965 | Silver et al. ........................ 308/121 |
| 3,215,480 | 11/1965 | Marley ............................... 308/121 |
| 3,298,751 | 1/1967 | Elwell . |
| 3,366,427 | 1/1968 | Silver et al. . |
| 3,375,046 | 3/1968 | Marley ............................... 308/164 |
| 3,382,014 | 5/1968 | Marley ................................... 308/9 |
| 3,395,949 | 8/1968 | Kun . |
| 3,434,761 | 3/1969 | Marley ................................... 308/9 |
| 3,434,762 | 3/1968 | Marley ................................... 308/9 |
| 3,467,451 | 9/1969 | Marley ................................. 308/26 |
| 3,495,886 | 2/1970 | Roberts et al. ..................... 308/135 |
| 3,504,953 | 4/1970 | Love .................................... 308/15 |
| 3,506,314 | 4/1970 | Gross .................................... 308/9 |
| 3,511,544 | 5/1970 | Marley . |
| 3,520,578 | 7/1970 | Licht ..................................... 308/9 |
| 3,542,440 | 11/1970 | Brand et al. ......................... 308/73 |
| 3,552,815 | 1/1971 | Keller ................................. 308/238 |
| 3,615,121 | 10/1971 | Barnett et al. ........................ 308/9 |
| 3,635,534 | 1/1972 | Barnett ............................... 308/121 |
| 3,642,331 | 2/1972 | Silver .................................. 308/35 |
| 3,677,612 | 7/1972 | Barnett et al. . |
| 3,744,858 | 7/1973 | Weichsel ........................... 308/5 R |
| 3,747,997 | 7/1973 | Winn .................................... 308/9 |
| 3,750,249 | 8/1973 | Brandon et al. ................. 308/237 R |
| 3,788,713 | 1/1974 | Kraus ................................. 308/160 |
| 3,795,427 | 3/1974 | Licht et al. ............................ 308/9 |
| 3,806,209 | 4/1974 | Lasing et al. .......................... 308/9 |
| 3,809,443 | 5/1974 | Cherubim ............................. 308/9 |
| 3,884,534 | 4/1975 | Winn .................................... 308/9 |
| 3,893,733 | 7/1975 | Silver et al. ........................... 308/9 |
| 3,951,474 | 4/1976 | Hughes et al. ........................ 308/9 |
| 3,957,317 | 5/1976 | Silver ................................... 308/9 |
| 4,133,585 | 1/1979 | Licht ............................ 308/DIG. 1 |
| 4,168,101 | 9/1979 | DiGrande .......................... 308/160 |
| 4,170,389 | 10/1979 | Eshel .................................. 308/160 |
| 4,227,752 | 10/1980 | Wilcock ................................ 308/9 |

Primary Examiner—Lenard A. Footland
Attorney, Agent, or Firm—Joseph V. Claeys

[57] ABSTRACT

A compliant hydrodynamic fluid thrust bearing includes a resilient support system having a two-stage spring arrangement for supporting a flexible bearing sheet. The spring arrangement includes a bundle of nested Belleville springs arranged in parallel and a corrugated spring member arranged in series with the Belleville spring bundle. This arrangement provides an overall spring characteristic of relatively low stiffness under light load, an increased stiffness under the loads normally encountered during operation of the bearing, and a decreased stiffness under loads in excess of the rated capacity of the bearing. This spring characteristic enables the bearing sheet to deflect early under light hydrodynamic loads to assure the correct filt with respect to the thrust runner to establish supporting fluid films; to support the axial load during normal operating conditions; and to deflect under extreme transient loads to share misalignment or gross vibration loads with adjacent bearing areas.

7 Claims, 6 Drawing Figures ns to correspond with the stiffness of the fluid supporting film during normal operating conditions and under normally encountered loads, and to yield compliantly to loads which would exceed the load capacity of the supporting fluid film and thereby share with adjacent areas of the bearing the transient high load conditions to prevent bearing failure under these extreme load conditions.

NESTED BELLEVILLE SPRING SUPPORT FOR COMPLIANT THRUST BEARINGS

BACKGROUND OF THE INVENTION

This invention relates to compliant thrust bearings, and more particularly to a resilient support system for compliant bearings formed of a bundle of nested Belleville springs.

The compliant hydrodynamic fluid thrust bearing has shown itself to be nearly ideal for many applications in which other forms of bearings are completely unsuitable. For example, certain ultra-high-speed and high-temperature applications require fluid film bearings which can accommodate varying load conditions and dimensional changes due to temperature and speed. The compliant hydrodynamic fluid film thrust bearing fills this need by enabling the bearing surface to conform to the shape and deflection patterns of the thrust runner, and therefore, is able to operate satisfactorily in conditions under which other bearings, even other fluid film bearings, would fail.

Although this bearing has performed well in past applications, there are anticipated applications in the future which will make even greater demands on its performance characteristics. In particular, it is anticipated that the speed and capacity demands on the bearing will increase significantly in anticipated future uses, and the capacity of the bearing as it is presently designed will be exceeded by these future applications.

The resilient support for the bearing sheet in bearings of this nature has two basic functions. It must enable the bearing sheet to assume the correct hydrodynamic shape with respect to the thrust runner so that supporting hydrodynamic fluid films are generated by the relative movement of the thrust runner and the bearing sheet. In addition, the bearing sheet must be supported in a manner to enable it to conform to the thrust runner despite load fluctuations exerted by rotor imbalance, eccentric loading of the rotor and thermal, centrifugal and other dimensional variations which occur in operation. These deflections of the bearing sheet, necessary for optimum performance of a bearing, are not necessarily produced by a uniform spring constant. For example, the spring stiffness which enables the bearing sheet to assume the correct hydrodynamic shape with respect to the thrust runner may be too compliant for optimum support of the thrust runner during normal operation, which in turn may be too stiff to give the desired self-alignment capability under load fluctuations on the rotor. Thus, it is necessary that a designer of bearings of this nature know exactly what response he wants the resilient support element for the bearing sheet to have under what load conditions, and then design the spring characteristic to produce the desired response. The prior art analysis of the desired spring characteristics has not fully appreciated the significance of the dual function of the resilient support of the bearing sheet and, more importantly, has failed to develop a spring system which would satisfy these requirements.

SUMMARY OF THE INVENTION

Accordingly, it is an object of this invention to provide a compliant hydrodynamic fluid film thrust bearing having a resilient support which enables the bearing sheet to deflect under relatively small loads to assume the optimum hydrodynamic profile with respect to the thrust runner, to thereafter present the optimum stiffness to correspond with the stiffness of the fluid supporting film during normal operating conditions and under normally encountered loads, and to yield compliantly to loads which would exceed the load capacity of the supporting fluid film and thereby share with adjacent areas of the bearing the transient high load conditions to prevent bearing failure under these extreme load conditions.

The object of the invention is met by two embodiments of the invention wherein a spring system includes two spring units arranged in series. One spring unit has a bearing stiffness curve having a low stiffness under small load conditions and the, beyond a certain deflection, increasing to high stiffness thereafter. The second spring unit has a stiffness curve which is initially stiff up to a certain load condition and thereafter becomes relatively compliant. The two spring units in series provide a system which is initially compliant to enable the bearing surface to assume the correct hydrodynamic profile with respect to the thrust runner; after the initial load is borne, the spring system becomes increasingly stiff to correspond to the increasing stiffness of the supporting fluid film; when the load increases so that the load carrying capacity of the supporting fluid film is reached, the spring system then becomes relatively compliant to deflect and share the load with adjacent bearing areas.

The two spring units include a corrugated spring member arranged in series with a nested bundle of Belleville springs arranged in parallel.

DESCRIPTION OF THE DRAWINGS

The objects of the invention and the invention itself will become better understood by reference to the following detailed description of the preferred embodiments when read in conjunction with an examination of the following drawings, wherein.

DESCRIPTION OF THE PREFERRED EMBODIMENT

Figure 1:
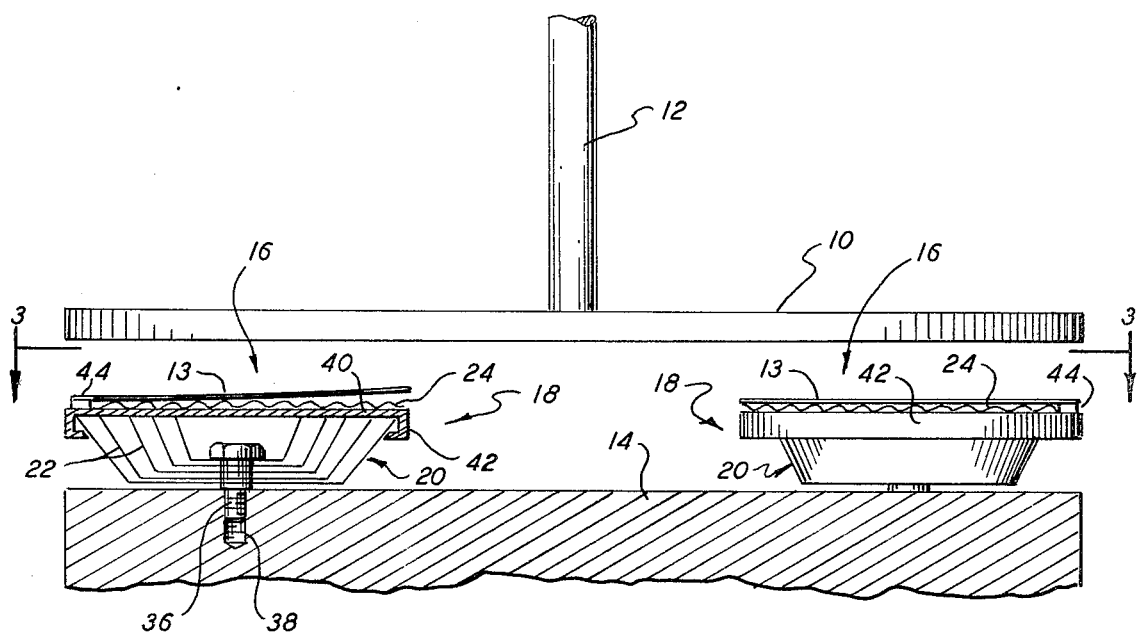
FIG. 1 is an elevation, partly in section, of a thrust bearing according to this invention.
Figure 2:
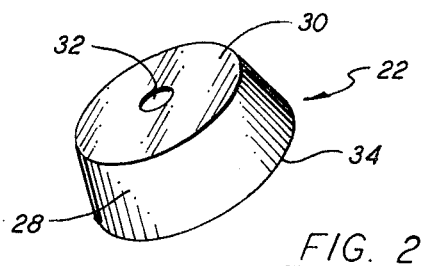
FIG. 2 is a perspective view of one of the Belleville springs shown in FIG. 1.

Referring now to the drawings, wherein like and primed reference characters designate identical and corresponding parts, respectively, and more particularly to FIG. 1 thereof, a thrust bearing is shown having a thrust runner 10 mounted on a rotating shaft 12. A thrust plate 14 is disposed in parallel opposed relation to the thrust runner 10. The thrust plate 14 carries a plurality of thrust pads 16 spaced angularly around the axial projection of the thrust runner 10 as shown in FIG. 2. Each thrust pad 16 includes a top bearing sheet 13 supported by a spring system 18 to enable the bearing sheet 13 to deflect under the initial fluid forces which develop as the shaft 12 begins rotating to assume the correct hydrodynamic orientation with respect to the plane of the thrust runner 10, and also to enable the thrust pad 16 as a whole to deflect under varying load conditions to conform to the plane of the thrust runner and avoid exceeding the load carrying capacity of the hydrodynamic supporting fluid film on the surface of the thrust pad 16.

The spring system 18 includes a pair of spring assemblies arranged in series. The lower spring unit includes a bundle 20 of nested Belleville springs 22 arranged in parallel and supporting a corrugated or wavy spring 24 as more completely described in U.S. Patent Application Ser. No. 974,256, filed on Dec. 29, 1978 issued as U.S. Pat. No. 4,277,111, the disclosure of which is incorporated herein by reference. The term "arranged in parallel" means that the springs will individually bear their portion of the load. When springs are "arranged in series," it means the entire load is borne by each of the springs. Thus, in the spring system 18 of FIG. 1, the entire load is borne by the spring unit 20 and also the spring unit 24, but the load is shared among the individual spring elements 22 of the spring unit 20.

Each Belleville spring element 22, shown clearly in FIG. 2, is in the form of a truncated cone-shaped wall 28 having a web portion 30 through which is formed a central aperture 32. The bundle 20 of Belleville springs 22 is arranged as shown in FIG. 1 with the apertures 32 aligned and the walls 28 in parallel and equally spaced relationship. The top edges 34 of the cone-shaped wall are all disposed in the same plane. A bolt 36 extends through the aligned hole 32 in the end plates 30 and is threaded into an internally threaded bore 38 drilled into the thrust plate 14. The bolt 36 holds the bundle of Belleville springs 22 in correct alignment with respect to each other and with respect to the thrust plate 14.

A plate 40 is disposed on the surface defined by the top edges 34 of the spring members 22. The plate 40 is stiff enough to bend as a unit and spread the load exerted by the runner 10 onto the supporting spring members 22. Thus, the plate 40 can move axially and tilt bodily but will not bend and will remain flat under all conditions of operation. The plate 40 is retained on the top surface of the spring unit 20 by any suitable means which permits the spring members 22 to flex individually. The retention structure disclosed in FIG. 1 is a flanged ring 42 welded to the peripheral edge of the plate 40 and extending downwardly and inwardly to the outside spring member 22 to retain the plate 40 axially and laterally in place on the spring unit 20.

The second spring unit 24 is mounted on the top of the plate 40. As more completely described in the aforementioned U.S. Pat. No. 4,277,111, the second spring unit 24 is a corrugated spring fastened along the leading edge 44 of the plate 40 in the direction of rotation of the thrust runner 10.

In operation, the thrust runner is supported on a fluid film such as air generated over the bearing sheets 13 by hydrodynamic action. The load is initially light and the spring stiffness of the second spring unit 24 is correspondingly soft to enable the bearing sheet to deflect to the correct orientation with respect to the runner 10 to generate a hydrodynamic fluid "cushion" between the runner 10 and the bearing sheet 13.

Figure 4:
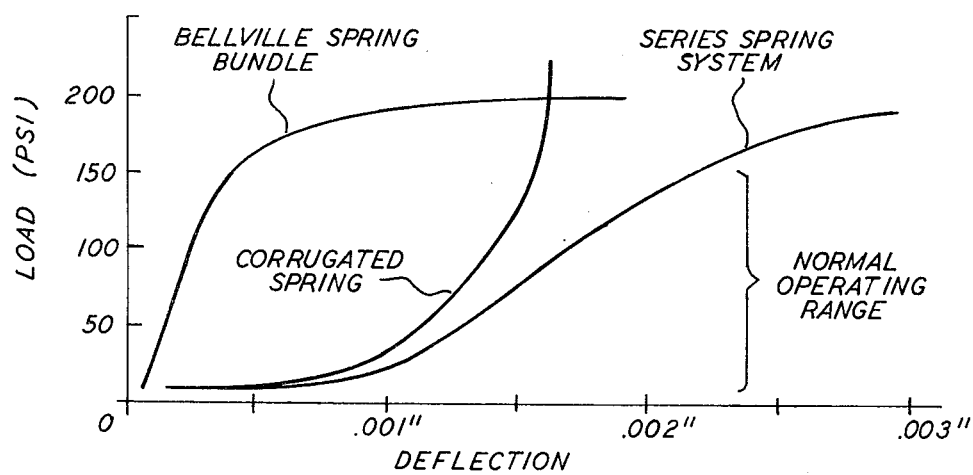
FIG. 4 is a load/deflection graph of the individual spring units and the spring system in the embodiment shown in FIGS. 1 and 2.

As shown in FIG. 4, in the normal operating range, the corrugated spring unit 24 increases in stiffness as the load increases to provide a support whose stiffness corresponds to the increasing stiffness of the fluid film. Above the normal operating range, the pads should be able to deflect to prevent transient loads which exceed the capacity of the bearing from damaging it. The load characteristic of the nested Belleville spring unit 20, shown in FIG. 4, permits large deflections of the pad to enable the transient off-center load on one pad to be shared by adjacent pads, or to enable the entire series of pads to deflect without permanent damage.

Figure 1A:
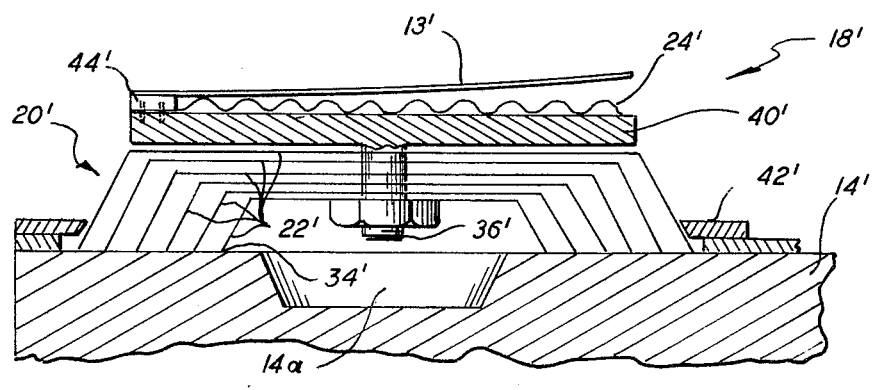
FIG. 1A is a variation of the bearing shown in FIG. 1.
Figure 3:
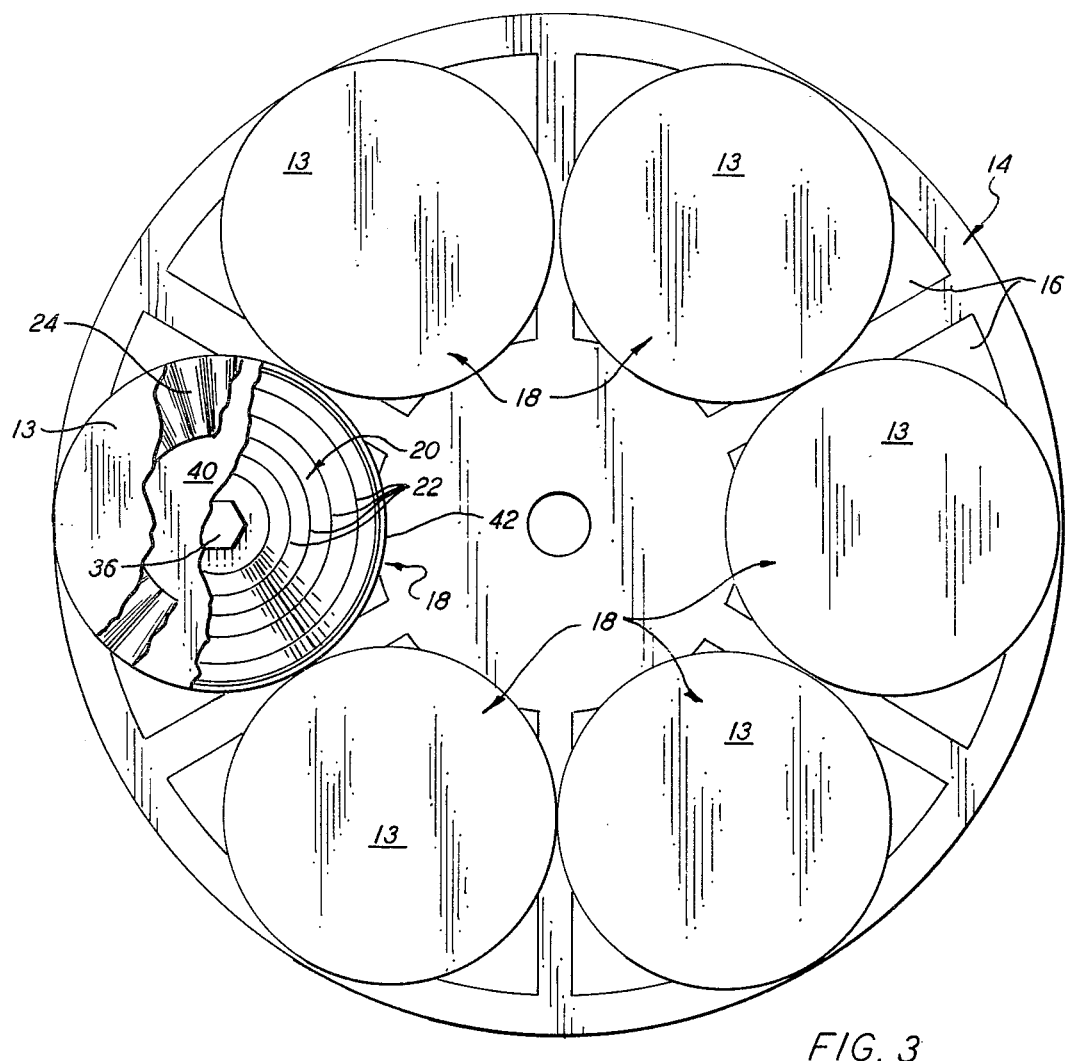
FIG. 3 is a plan view of the bearing shown in FIG. 1 along lines 3—3.

The nest of Belleville springs can be inverted as shown in FIG. 1A so that the free peripheral edges 34' of the springs contact the thrust plate 14', and the web portions 30' are facing the thrust runner. The backing plate 40' is supported on the webs 30' and includes an integral stud 36' which extends through the aligned holes 32' in the webs 30'. A nut is threaded on the stud 36' to secure the webs tightly together and thereby secure the Belleville spring elements together in a unified assembly. A shallow well 14a is provided in the thrust plate 14' to permit deflection of the spring nest 20' without interference between the stud 36' and the top surface of the thrust plate.

The bearing sheet 13' and the wavy spring 24' are fastened to the top of the backing plate 40' in the same manner as shown in FIG. 1. It is also contemplated that the springs could be fastened together with a stud welded to the top spring, and the top bearing sheet and wavy spring assembly attached to and supported directly by the web of the top spring element.

A flanged ring 42' is fastened to the thrust plate 14' over the Belleville spring nest 20'. The ring 42' is dimensioned slightly larger than the outside diameter of the Belleville spring nest to permit expansion of the springs while securing the bearing pad in position laterally on the thrust plate.

Figure 6:
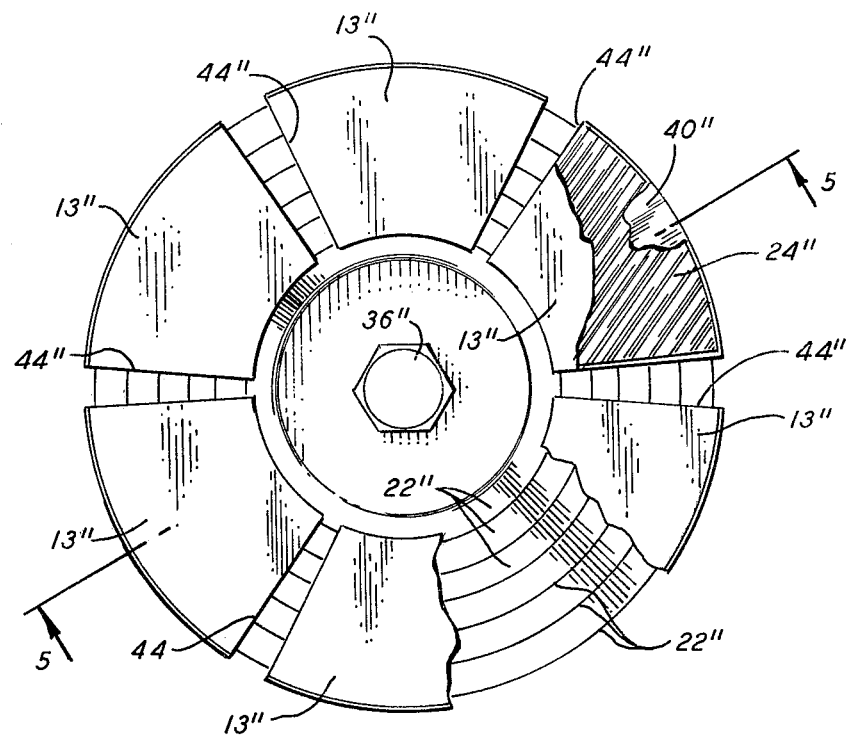
FIG. 6 is a plan view of the embodiment of a thrust bearing shown in FIG. 5.
Figure 5:
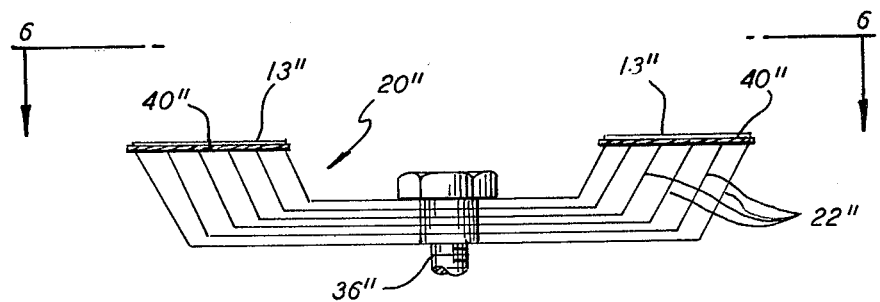
FIG. 5 is a sectional elevation of a third embodiment of the invention.

A third embodiment of the invention is shown in FIGS. 5 and 6. The Belleville spring nest 20" is disposed concentrically to the thrust plate and is fastened thereto at its center by a bolt 36" extending through aligned holes formed in the center of the webs 30". The backing plates 44" for the individual pads are fastened to the top peripheral edges of the Belleville spring elements 22" and support corrugated spring elements 24" which, in turn, support the individual bearing sheets 13" in the same manner as described for the embodiments of FIGS. 1 and 1A.

In each of the three disclosed embodiments, the Belleville spring elements 20" are arranged in parallel with each other, and the cluster or nest 20 as a unit is disposed in series with the spring units 24. The spring units themselves are arranged in parallel with respect to the thrust runner, so the spring system is parallel-series-parallel. This gives the desired operating spring characteristic over the entire load bearing range of the bearing, namely, compliance at the lower and upper ranges of the load range, and stiffness in the center of the range to match the fluid film stiffness.

Obviously, numerous modifications and variations of the described embodiments are possible in view of this disclosure. Therefore, it is expressly to be understood that these modifications and their equivalents may be practiced while remaining within the spirit and scope of the invention defined by the following claims, Wherein I claim:

1. A compliant hydrodynamic fluid thrust bearing, comprising:
   a thrust plate and a relatively rotatable thrust runner having a bearing surface disposed in axially spaced parallel relation to said thrust plate;

a flexible bearing sheet having a bearing surface facing said thrust runner bearing surface for carrying an axial load exerted by said thrust runner;

a resilient support means for supporting said bearing sheet, including a plurality of Belleville springs arranged in parallel with respect to said load, said springs being disposed in a nested bundle with one axial end of each spring facing and operatively supporting a portion of the load on said bearing sheet and the other axial end facing said thrust plate and transferring the modified load thereto.

2. The bearing defined in claim 1, wherein said resilient support also includes a second spring assembly arranged in series with said nested bundle.

3. The bearing defined in claim 2, wherein the spring characteristics of one spring assembly is initially stiff under light and normal loads and then becomes compliant near the load carrying capacity of the bearing; the spring characteristic of the other spring assembly is initially compliant and then becomes stiff for the normal operating load range of the bearing; the spring characteristic of the spring system is initially compliant under light loads, becomes increasingly stiff under increasing loads, and becomes compliant at loads near the bearing load capacity.

4. The bearing defined in claim 3 wherein said second spring assembly includes a corrugated spring.

5. A compliant hydrodynamic fluid film thrust bearing, comprising a thrust plate and a relatively rotatable thrust runner having a bearing surface disposed in axially spaced parallel relation to said thrust plate; a flexible bearing sheet having a bearing surface facing said thrust runner bearing surface for carrying an axial load exerted by said thrust runner; and a resilient supporting means for supporting said bearing sheet, and said supporting means including:

a pair of spring assemblies arranged in series;

one of said spring assemblies including a plurality of Belleville springs arranged in parallel and having a spring characteristic that is initially stiff under light and normal loads and then becomes compliant near the load carrying capacity of the bearing; the spring characteristic of the other spring assembly being initially compliant and then becoming stiff for the normal operating load range of the bearing;

whereby the spring characteristic of said supporting means is initially compliant under light loads, becomes increasingly stiff under increasing loads, and becomes compliant at loads near the bearing load capacity.

6. The bearing defined in claim 5, wherein said one spring assembly includes a series of nested bundles of Belleville springs disposed around said thrust plate.

7. The bearing defined in claim 5, wherein said one spring assembly includes a single nested bundle of Belleville springs disposed concentrically with said thrust plate.

* * * * *